(12) United States Patent
Murakami et al.

(10) Patent No.: US 10,625,392 B2
(45) Date of Patent: Apr. 21, 2020

(54) POLISHING PAD

(71) Applicant: NITTA HAAS INCORPORATED, Osaka (JP)

(72) Inventors: Yohei Murakami, Kyoto (JP); Nobuyuki Oshima, Kyoto (JP); Hiroyuki Nakano, Kyoto (JP)

(73) Assignee: NITTA HAAS INCORPORATED, Osaka (JP)

( * ) Notice: Subject to any disclaimer, the term of this patent is extended or adjusted under 35 U.S.C. 154(b) by 199 days.

(21) Appl. No.: 15/561,543

(22) PCT Filed: Mar. 14, 2016

(86) PCT No.: PCT/JP2016/057981
§ 371 (c)(1),
(2) Date: Sep. 26, 2017

(87) PCT Pub. No.: WO2016/158348
PCT Pub. Date: Oct. 6, 2016

(65) Prior Publication Data
US 2018/0079050 A1     Mar. 22, 2018

(30) Foreign Application Priority Data

Mar. 30, 2015  (JP) .................................. 2015-068387

(51) Int. Cl.
| | |
|---|---|
| *B24B 37/24* | (2012.01) |
| *C08G 18/79* | (2006.01) |
| *C08G 18/76* | (2006.01) |
| *C08G 18/32* | (2006.01) |
| *C08G 18/38* | (2006.01) |
| *C08G 18/48* | (2006.01) |
| *C08G 18/78* | (2006.01) |
| *C08G 18/73* | (2006.01) |
| *C08G 18/75* | (2006.01) |
| *C08G 18/42* | (2006.01) |
| *C08G 18/44* | (2006.01) |
| *C08G 101/00* | (2006.01) |

(52) U.S. Cl.
CPC .......... *B24B 37/24* (2013.01); *C08G 18/3206* (2013.01); *C08G 18/3212* (2013.01); *C08G 18/3215* (2013.01); *C08G 18/3237* (2013.01); *C08G 18/3259* (2013.01); *C08G 18/3814* (2013.01); *C08G 18/3868* (2013.01); *C08G 18/4238* (2013.01); *C08G 18/4277* (2013.01); *C08G 18/44* (2013.01); *C08G 18/4825* (2013.01); *C08G 18/4833* (2013.01); *C08G 18/4837* (2013.01); *C08G 18/4854* (2013.01); *C08G 18/73* (2013.01); *C08G 18/751* (2013.01); *C08G 18/755* (2013.01); *C08G 18/758* (2013.01); *C08G 18/7614* (2013.01); *C08G 18/7621* (2013.01); *C08G 18/7642* (2013.01); *C08G 18/7664* (2013.01); *C08G 18/7671* (2013.01); *C08G 18/7678* (2013.01); *C08G 18/78* (2013.01); *C08G 18/7825* (2013.01); *C08G 18/7831* (2013.01); *C08G 18/7837* (2013.01); *C08G 18/791* (2013.01); *C08G 18/797* (2013.01); *C08G 2101/00* (2013.01)

(58) Field of Classification Search
CPC ........ B24B 37/24; C08G 18/00; H01L 21/304
USPC ................................... 451/526; 51/296, 298
See application file for complete search history.

(56) References Cited

U.S. PATENT DOCUMENTS

| | | | |
|---|---|---|---|
| 7,445,847 B2 | 11/2008 | Kulp et al. | |
| 9,149,905 B2 | 10/2015 | Itoyama et al. | |
| 2007/0117393 A1* | 5/2007 | Tregub | ............ B24B 37/24 438/692 |
| 2007/0275226 A1 | 11/2007 | Kulp et al. | |
| 2014/0242894 A1 | 8/2014 | Itoyama et al. | |

FOREIGN PATENT DOCUMENTS

| | | |
|---|---|---|
| CN | 100540225 | 9/2009 |
| CN | 103930975 | 7/2014 |
| JP | 2005-015643 | 1/2005 |
| JP | 2007-246805 | 9/2007 |
| JP | 2010-082719 | 4/2010 |
| JP | 2010-240777 | 10/2010 |
| JP | 2015-006729 | 1/2015 |

\* cited by examiner

*Primary Examiner* — Robert A Rose
(74) *Attorney, Agent, or Firm* — Clark & Brody LP

(57) ABSTRACT

The present invention is a polishing pad formed by foamed polyurethane, with a content of S phase in the foamed polyurethane, as determined by pulsed NMR measurement at 25° C., exceeding 70%.

2 Claims, No Drawings

POLISHING PAD

CROSS-REFERENCE TO RELATED APPLICATION

This application claims priority to Japanese Patent Application No. 2015-068387, the disclosure of which is incorporated herein by reference in its entirety.

FIELD

The present invention relates to a polishing pad.

BACKGROUND

For polishing an object to be polished such as a silicon wafer used as a semiconductor substrate, polishing pads formed by foamed polyurethane are widely used (e.g., Patent Literature 1).

CITATION LIST

Patent Literature

Patent Literature 1: JP 2015-6729 A

SUMMARY

Technical Problem

However, frictional heat is generated when an object to be polished is polished using conventional polishing pads, as a result of which the hardness changes due to the frictional heat. Therefore, there are cases where the object to be polished cannot be sufficiently polished or the object to be polished is damaged in conventional polishing pads, and thus there is a problem that the object to be polished cannot be stably polished.

In view of the aforementioned problem, it is therefore an object of the present invention to provide a polishing pad that undergoes a small change in hardness due to a change in temperature.

Solution to Problem

The present invention is a polishing pad formed by foamed polyurethane, with a content of S phase in the foamed polyurethane, as determined by pulsed NMR measurement at 25° C., exceeding 70%.

Further, according to an embodiment of the polishing pad according to the present invention, a ratio of a content of S phase in the foamed polyurethane, as determined by pulsed NMR measurement at 60° C., is 80% or more, with respect to the content of S phase in the foamed polyurethane, as determined by pulsed NMR measurement at 25° C.

DESCRIPTION OF EMBODIMENT

Hereinafter, an embodiment of the present invention will be described.

A polishing pad of this embodiment is formed by foamed polyurethane.

A content of S phase in the foamed polyurethane, as determined by pulsed NMR measurement at 25° C., exceeds 70%, preferably 80 to 100%, more preferably 90 to 100%.

In the pulsed NMR measurement, the foamed polyurethane is identified into a phase (short phase) (S phase) in which the spin-spin relaxation time is less than 0.03 ms, a phase (middle phase) (M phase) in which the spin-spin relaxation time is 0.03 ms or more and less than 0.2 ms, and a phase (long phase) (L phase) in which the spin-spin relaxation time is 0.2 ms or more, to determine the content of each phase. The spin-spin relaxation time can be determined, for example, by performing measurements using the Solid Echo method and "JNM-MU25" manufactured by JEOL Ltd.

In the pulsed NMR, when the elapsed time after application of the pulsed magnetic field is referred to as t (ms), the magnetization at t=0 is referred to as $M_0$, and the magnetization at time t is referred to as M (t), the spin-spin relaxation time ($T_2$) is determined based on the following formula. In the following formula, "W" denotes the Weibull modulus.

$$M(t) = M_0 \exp\left(-\frac{t}{T_2}\right)^W \quad \text{Formula 1}$$

Further, when the measurement target is decomposed into n components, and it is supposed for the i-th (i<n) component that the magnetization of the i-th component at t=0 is referred to as $M_{0i}$, and the Weibull modulus of the i-th component is referred to as $W_i$, the spin-spin relaxation time ($T_{2i}$) of the i-th component and the ratio $F_i$ of the i-th component are determined based on the following formula. For example, $W_S=2$, $W_M=1$, and $W_L=1$ can be used as the Weibull modulus $W_i$. Such a method for determining the relaxation time is, for example, disclosed in S. Yamasaki et al Polymer 48 4793 (2007).

$$M(t) = \sum_i^n M_{0i} \exp\left(-\frac{t}{T_{2i}}\right)^{W_i} \quad \text{Formula 2}$$

$$F_i = \frac{M_{0i}}{\sum_i^n M_{0i}} \quad \text{Formula 3}$$

Concerning the content of each of S phase, M phase, and L phase, the crystalline phase is mainly observed as S phase, and the amorphous phase is mainly observed as L phase, in the pulsed NMR measurement, for example. Further, hard segments are mainly observed as S phase, and soft segments are mainly observed as L phase, in the pulsed NMR measurement. Further, foamed polyurethanes with various "crystalline phase ratio" and "hard segment ratio" are known. By increasing urethane bonds or urea bonds, the "hard segment ratio" can be increased. Materials for the foamed polyurethane will be described below, but urethane bonds can be increased, for example, by increasing the amount of short-chain diols (such as diethylene glycol (DEG) and low-molecular weight polyethylene glycol (PEG)) to be used when bonding isocyanate to polyol. Further, urea bonds can be increased, for example, by increasing the amount of MOCA to be used or decreasing the heating temperature for reaction, when bonding isocyanate-terminated prepolymer to 4,4'-methylenebis (2-chloro aniline) (MOCA). Further, the "crystallization phase ratio" can be increased, for example, by reducing chemical crosslinking and thereby making it easy for hard segments to approach each other. Therefore, the content of S phase can be increased by increasing the crystalline phase ratio or increasing the hard segment ratio.

The ratio of the content of S phase in the foamed polyurethane, as determined by pulsed NMR measurement at 60° C., is preferably 80% or more, more preferably 90 to 100%, with respect to the content of S phase in the foamed polyurethane, as determined by pulsed NMR measurement at 25° C.

The foamed polyurethane can be obtained by mixing an isocyanate group-containing compound containing an isocyanate group, an active hydrogen-containing organic compound containing an active hydrogen, and a foaming agent, followed by heating.

As the isocyanate group-containing compound, aromatic diisocyanate, aliphatic diisocyanate, alicyclic diisocyanate, or the like can be used. These examples of the isocyanate group-containing compound can be used individually, or a plurality of them can be used in combination.

As the aromatic diisocyanate, crude diphenylmethane diisocyanate (crude MDI) obtained by obtaining an amine mixture by condensation of aniline with formaldehyde and reacting the amine mixture with phosgene in an inert solvent, diphenylmethane diisocyanate (pure MDI) obtained by purifying the crude MDI, polymethylene polyphenylene polyisocyanate (polymeric MDI), and modified products of these can be used. Further, tolylene diisocyanate (TDI), 1,5-naphthalene diisocyanate, xylylene diisocyanate, 1,3-phenylene diisocyanate, 1,4-phenylene diisocyanate, or the like can be used. These examples of the aromatic diisocyanate can be used individually, or a plurality of them can be used in combination.

Examples of the modified products of diphenylmethane diisocyanate include carbodiimide-modified products, urethane-modified products, allophanate-modified products, urea-modified products, biuret-modified products, isocyanurate-modified products, and oxazolidone-modified products. Specific examples of the modified products include carbodiimide-modified diphenylmethane diisocyanate (carbodiimide-modified MDI).

As the aliphatic diisocyanate, ethylene diisocyanate, 2,2,4-trimethylhexamethylene diisocyanate, 1,6-hexamethylene diisocyanate, or the like is used.

As the alicyclic diisocyanate, 1,4-cyclohexane diisocyanate, 4,4'-dicyclohexylmethane diisocyanate, isophorone diisocyanate, norbornane diisocyanate, methylenebis(4,1-cyclohexylene)=diisocyanate, or the like is used.

As the isocyanate group-containing compound, diphenylmethane diisocyanate (pure MDI), polymeric MDI, or modified products of these are preferable, since it is easy to control the working environment due to their lower vapor pressure and less chance of volatilization. Further, carbodiimide-modified MDI, polymeric MDI, or a mixture of these with MDI is preferable because of their lower viscosity and ease of handling.

The active hydrogen-containing organic compound is an organic compound having an active hydrogen group capable of reacting with an isocyanate group in the molecule. Specific examples of the active hydrogen group include functional groups such as a hydroxy group, a primary amino group, a secondary amino group, and a thiol group. The active hydrogen-containing organic compound may have only one type of such functional groups in the molecule or may have a plurality of types of such functional groups in the molecule.

As the active hydrogen-containing organic compound, a polyol compound having a plurality of hydroxy groups in the molecule, a polyamine compound having a plurality of primary amino groups or secondary amino groups in the molecule, or the like can be used.

As the polyol compound, a polyhydric alcohol having a molecular weight of 400 or less, a polyol prepolymer having a molecular weight exceeding 400, or the like can be mentioned.

Examples of the polyhydric alcohol having a molecular weight of 400 or less include linear aliphatic glycols such as ethylene glycol, propylene glycol, 1,3-propane diol, 1,3-butanediol, 1,5-pentane diol, 3-methyl-1,5-pentane diol, 1,6-hexane diol, diethylene glycol, triethylene glycol, tetraethylene glycol, dipropylene glycol, tripropylene glycol, polyethylene glycol having a molecular weight of 400 or less, 1,8-octane diol, and 1,9-nonane diol; branched aliphatic glycols such as neopentyl glycol, 3-methyl-1,5-pentane diol, 2-methyl-1,3-propane diol, 2-butyl-2-ethyl-1,3-propane diol, and 2-methyl-1,8-octane diol; alicyclic diols such as 1,4-cyclohexane diol, 1,4-cyclohexanedimethanol, and water-added bisphenol A; and polyfunctional polyols such as glycerin, trimethylolpropane, tributylolpropane, pentaerythritol, and sorbitol.

Examples of the polyol prepolymer having a molecular weight exceeding 400 include polyether polyol, polyester polyol, polyester polycarbonate polyol, and polycarbonate polyol. As the polyol prepolymer, a polyfunctional polyol prepolymer having 3 or more hydroxy groups in the molecule also can be mentioned.

Specific examples of the polyether polyol include polytetramethylene glycol (PTMG), polypropylene glycol (PPG), polyethylene glycol (PEG), and ethylene oxide-added polypropylene polyol.

Examples of the polyester polyol include polybutylene adipate, polyhexamethylene adipate, and polycaprolactone polyol.

Examples of the polyester polycarbonate polyol include a reaction product of polyester glycol such as polycaprolactone polyol with alkylene carbonate, a reaction product obtained by obtaining a reaction mixture by reacting ethylene carbonate with polyhydric alcohol and further reacting the reaction mixture with organic dicarboxylic acid.

Examples of the polycarbonate polyol include a reaction product of a diol such as 1,3-propane diol, 1,4-butanediol, 1,6-hexane diol, diethylene glycol, polyethylene glycol, polypropylene glycol, or polytetramethylene glycol, with phosgene, diallyl carbonate (such as diphenyl carbonate), or cyclic carbonate (such as propylene carbonate).

The polyol compound can be used alone or two or more types thereof can be used in combination.

As the polyhydric alcohols, ethylene glycol and diethylene glycol are preferable since the strength during reaction is more easily increased, the rigidity of a polishing pad containing foamed polyurethane produced is more easily increased, and they are comparatively inexpensive.

The polyol prepolymer preferably has a number-average molecular weight of 800 to 8000, because of ease of obtaining elastic foamed polyurethane, and specifically, polytetramethylene glycol (PTMG), and ethylene oxide-added polypropylene polyol are preferable.

Examples of the polyamine compound include 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, 1,2-bis(2-aminophenylthio)ethane, and 4,4'-diamino-3,3'-diethyl-5,5'-dimethyldiphenylmethane.

The foaming agent is not specifically limited as long as it generates a gas to become air bubbles so as to form air bubbles in the foamed polyurethane when the foamed polyurethane is formed. For example, organic chemical foaming agents decomposed by heating to generate a gas, low boiling hydrocarbons having a boiling point of −5 to 70° C., halogenated hydrocarbons, water, liquefied carbon dioxide gas, or the like can be used individually or in combination.

Examples of the organic chemical foaming agents include azo compounds such as azodicarbonamide, azobisisobutyronitrile, diazoaminobenzene, and barium azodicarboxylate, nitroso compounds such as N,N'-dinitrosopentamethylenetetramine and N,N'-dinitroso-N,N'-dimethylterephthalamide, and sulfonyl hydrazide compounds such as p,p'-oxybis(benzenesulfonylhydrazide) and p-toluenesulfonylhydrazide. Examples of the low boiling hydrocarbons include butane, pentane, cyclopentane, and a mixture of these. Examples of the halogenated hydrocarbons include methylene chloride and HFC (hydrofluorocarbons).

The polishing pad of this embodiment configured as above has the following advantages.

As a result of diligent studies, the inventors have found that a polishing pad formed by foamed polyurethane, with a content of S phase in the foamed polyurethane, as determined by pulsed NMR measurement at 25° C., falling within a specific range undergoes a small change in hardness due to a change in temperature, to conceive of this embodiment. That is, the polishing pad of this embodiment is a polishing pad formed by foamed polyurethane, with a content of S phase in the foamed polyurethane, as determined by pulsed NMR measurement at 25° C., exceeding 70%. The polishing pad of this embodiment has such a configuration, thereby having a small change in hardness due to a change in temperature.

The reason why the polishing pad of this embodiment has a small change in hardness due to a change in temperature when a content of S phase in the foamed polyurethane, as determined by pulsed NMR measurement at 25° C., exceeds 70% is considered as follows. The content of S phase in the foamed polyurethane exceeds 70%. Therefore, it is considered that the foamed polyurethane has parts where hard segments are crystallized in most parts, and the parts where the hard segments are crystallized are densely present. On the other hand, it is considered that soft segments are present between the parts where the hard segments are crystallized, or they are present continuously with the ends of the parts where the hard segments are crystallized. Then, it is considered that, in the foamed polyurethane, since the parts where the hard segments are crystallized are densely present, the intermolecular force between the hard segments is increased, and the hard segments are less likely to be separated from each other even when heated, as a result of which the hardness is less likely to decrease. Further, it is considered that, in the case where there are some points where the density of the parts where the hard segments are crystallized is small, the small-density points can have properties that the hard segments are likely to be separated from each other when heated, as compared with the high-density points, but their motion is suppressed by the surrounding high-density points, as a result of which the hardness is less likely to decrease. Further, it is considered that, even if a small amount of soft segments are present in the foamed polyurethane, the soft segments are short, and the motion of the soft segments that are trying to move when heated is suppressed by the parts where the hard segments are crystallized, as a result of which the hardness is less likely to decrease.

Further, in the polishing pad of this embodiment, a ratio of the content of S phase in the foamed polyurethane, as determined by pulsed NMR measurement at 60° C., is preferably 80% or more, with respect to the content of S phase in the foamed polyurethane, as determined by pulsed NMR measurement at 25° C.

The polishing pad according to the present invention is not limited to the aforementioned embodiment. Further, the polishing pad according to the present invention is not limited to the aforementioned operational effects. In the polishing pad according to the present invention, various modifications can be made without departing from the gist of the present invention.

EXAMPLES

Next, the present invention will be further specifically described by way of Experimental Examples.

Foamed polyurethanes of Experimental Examples 1 to 6 were prepared. Then, each foamed polyurethane was measured by pulsed NMR. The conditions of the pulsed NMR measurement were as follows. Further, the storage elastic modulus of each foamed polyurethane was measured. The storage elastic modulus was measured according to JIS K7244-4:1999 "Plastics-Method for testing dynamic mechanical properties-Part 4: Tensile vibration-Non-resonance method". The measurement conditions of the storage elastic modulus were as follows.

<Conditions of Pulsed NMR Measurement>
Measuring device: JNM-MU25, manufactured by JEOL Ltd.
Measurement method: Solid Echo method
Pulse width: 90° pulse, 2.0 μs
Repetition time: 4 sec
Cumulative number of times: 8 times
Measurement temperature: Room temperature (RT) (25° C.), 60° C., 80° C., and 100° C.
<Measurement Conditions of Storage Elastic Modulus>
Measuring device: Dynamic viscoelasticity measuring instrument DMS6100, manufactured by SII NanoTechnology Inc.
Frequency: 1 Hz
Initial load: 300 mN
Measurement mode: Tension-sine wave control mode
Temperature: 10 to 130° C.
Temperature increase: 5° C./min Table 1 shows the content of S phase at each temperature, and the ratio of the content of S phase at each temperature with respect to the content of S phase at 25° C. (shown as "Each temp./RT" in Table 1). Further, Table 2 shows the storage elastic modulus (E') at each temperature and the ratio of E' at each temperature with respect to E' at 25° C. (shown as "Each temp./RT" in Table 2).

TABLE 1

| Temp. (° C.) | Experimental Example 1 | | Experimental Example 2 | | Experimental Example 3 | | Experimental Example 4 | | Experimental Example 5 | | Experimental Example 6 | |
|---|---|---|---|---|---|---|---|---|---|---|---|---|
| | S phase (%) | Each temp./RT | S phase (%) | Each temp./RT | S phase (%) | Each temp./RT | S phase (%) | Each temp./RT | S phase (%) | Each temp./RT | S phase (%) | Each temp./RT |
| RT | 66.3 | — | 66.1 | — | 77.6 | — | 91.3 | — | 96.4 | — | 97.2 | — |
| 60 | 51.5 | 77.7% | 50.6 | 76.6% | 62.9 | 81.1% | 80.2 | 87.8% | 81.5 | 84.5% | 79.6 | 81.9% |

TABLE 1-continued

| Temp. (°C) | Experimental Example 1 | | Experimental Example 2 | | Experimental Example 3 | | Experimental Example 4 | | Experimental Example 5 | | Experimental Example 6 | |
| --- | --- | --- | --- | --- | --- | --- | --- | --- | --- | --- | --- | --- |
|  | S phase (%) | Each temp./RT | S phase (%) | Each temp./RT | S phase (%) | Each temp./RT | S phase (%) | Each temp./RT | S phase (%) | Each temp./RT | S phase (%) | Each temp./RT |
| 80 | 45.5 | 68.6% | 45.0 | 68.1% | 55.9 | 72.0% | 76.4 | 83.7% | 79.0 | 82.0% | 78.8 | 81.1% |
| 100 | 41.1 | 62.0% | 40.2 | 60.8% | 49.9 | 64.3% | 73.3 | 80.3% | 79.6 | 82.6% | 74.7 | 76.9% |

TABLE 2

| Temp. (°C) | Experimental Example 1 | | Experimental Example 3 | | Experimental Example 4 | | Experimental Example 5 | | Experimental Example 6 | |
| --- | --- | --- | --- | --- | --- | --- | --- | --- | --- | --- |
|  | E' (Pa) | Each temp./RT | E' (Pa) | Each temp./RT | E' (Pa) | Each temp./RT | E' (Pa) | Each temp./RT | E' (Pa) | Each temp./RT |
| RT | 1.5E+08 | — | 3.0E+08 | — | 4.2E+08 | — | 3.5E+08 | — | 2.5E+08 | — |
| 40 | 1.3E+08 | 81.9% | 2.5E+08 | 85.6% | 3.9E+08 | 91.6% | 3.2E+08 | 93.9% | 2.4E+08 | 95.3% |
| 60 | 9.2E+07 | 59.9% | 1.9E+08 | 63.0% | 3.3E+08 | 79.3% | 2.8E+08 | 81.4% | 2.1E+08 | 84.7% |

As shown in Tables 1 and 2, the foamed polyurethanes of Experimental Examples 3 to 6 with the content of S phase, as determined by pulsed NMR measurement at 25° C., exceeding 70% exhibited high values of the ratio of E' at each temperature with respect to E' at 25° C., as compared with the foamed polyurethane of Experimental Example 1. That is, it can be seen that the present invention can provide a polishing pad that undergoes a small change in hardness due to a change in temperature.

The invention claimed is:

1. A polishing pad formed by foamed polyurethane, with a content of S phase in the foamed polyurethane, as determined by pulsed NMR measurement at 25° C., exceeding 70%.

2. The polishing pad according to claim 1, wherein a ratio of a content of S phase in the foamed polyurethane, as determined by pulsed NMR measurement at 60° C., is 80% or more, with respect to the content of S phase in the foamed polyurethane, as determined by pulsed NMR measurement at 25° C.

\* \* \* \* \*